United States Patent [19]

Berlin et al.

[11] 4,053,754

[45] Oct. 11, 1977

[54] RECURSIVE PROCESSING OF MULTIPLE INTENSITY-MODULATED SCANS

[75] Inventors: Robert D. Berlin, Syracuse; Jack B. Williams, Liverpool, both of N.Y.

[73] Assignee: The United States of America as represented by the Secretary of the Air Force, Washington, D.C.

[21] Appl. No.: 698,988

[22] Filed: June 23, 1976

[51] Int. Cl.² .................................... G06F 7/38
[52] U.S. Cl. ........................ 364/723; 325/42; 328/167
[58] Field of Search ............ 235/152, 156; 325/41, 325/42; 328/167

[56] References Cited

U.S. PATENT DOCUMENTS

| | | | |
|---|---|---|---|
| 3,446,949 | 5/1969 | Trimble | 235/156 X |
| 3,599,155 | 8/1971 | McDowell et al. | 325/42 X |
| 3,878,334 | 4/1975 | Halpern | 325/42 X |
| 3,925,650 | 12/1975 | Brown | 235/156 X |

Primary Examiner—Jerry Smith
Attorney, Agent, or Firm—Joseph E. Rusz; William Stepanishen

[57] ABSTRACT

A recursive signal processing apparatus is disclosed which utilizes the slow fluctuations in position of a signal in a recurring intensity-modulated scan for signal enhancement by effectively performing an integration along the signal's past length.

5 Claims, 5 Drawing Figures

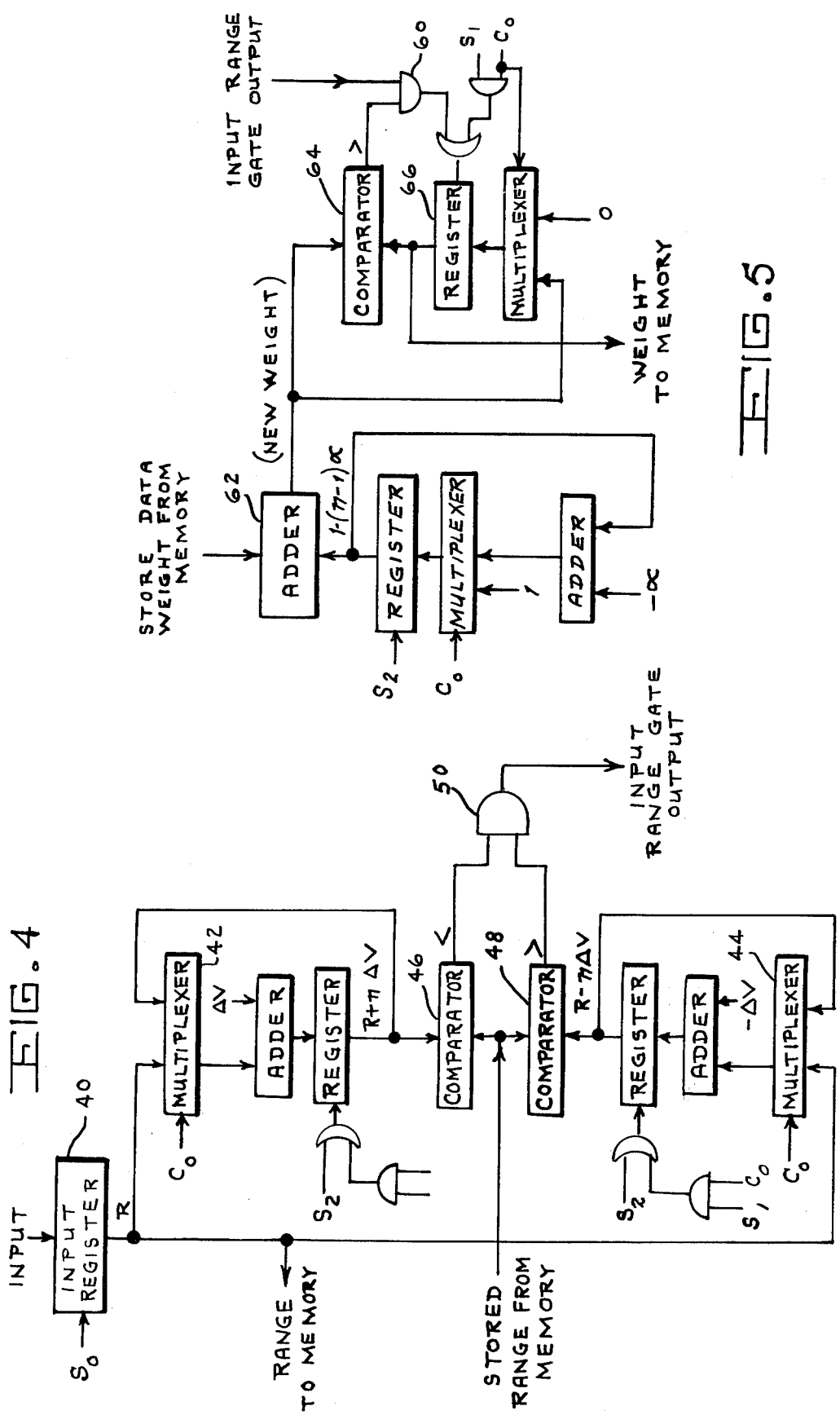

RECURSIVE PROCESSING OF MULTIPLE INTENSITY-MODULATED SCANS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a signal processing apparatus, and in particular to a recursive signal processing apparatus.

In many prior art data transmission schemes the information resides in the position of a signal pulse within some fixed range of positions. This range may be defined by the transmission of an independent synch pulse as in certain telemetry systems, by the generation of the transmitted pulse as in radar and sonar, or by any other means whereby the zero position to which the signal pulse is referenced is made known to the receiver. Each such transmission we refer to as a scan. In this general context there have arisen several fairly conventional methods of signal enhancement. These methods may be divided into three categories.

The first category is simple scan-to-scan non-coherent integration which may be performed easily, causing the signal to be enhanced to a degree depending largely upon the rate at which the signal position changes between consecutive scans. The more constant the signal position, the longer can be made the time constant of the integration. The fact that the signal position changes slowly, or in a continuous manner, from scan to scan is not explicitly taken advantage of.

The second category is the large variety of tracking schemes which originated in sonar and radar applications. These schemes may properly be regarded as signal enhancement techniques that depend upon exploiting the local linear nature of the signal path. More complex schemes which employ quadratic extrapolation, are merely a continuation of the same idea. These techniques typicaly differ from those disclosed here in the following respects.

The logic of these procedures is complicated, consisting usually of two distinct modes: the acquisition and the tracking modes. Some computation must normaly be devoted to processing the video such as thresholding, and scan-to-scan integration. The computational burden in each mode is high, and in tracking mode, each signal must be extrapolated, and logic devised to determine when the track must be considered lost. Additional logic in the acquisition mode must keep account of transitory tracks, and decide when acquisition is to be confirmed. The difficulties created by the possible crossing of tracks must be resolved. Thus, careful signal bookkeeping is an important part of the effort. Normally, the enhancement of the signal is purely binary: i.e. when it has been assigned a track, a signal is wholly enhanced; if not the signal is effectively invisible.

The third category comprises procedures based purely upon thresholded data: i.e., the intensity of each scan is prethresholded, so that the raw data consists solely of pulses, some of which may be noise, and, typically, at most one of which is signal. The usual procedures to achieve signal enhancement in this setting consist essentially of favoring that pulse which has been computed to belong to the strongest local linear trend. The linearity is not critical in such procedures (e.g. quadratic trends could be examined), but the fact that continuity is being examined locally makes the restriction to straight lines reasonable as well as computationally convenient.

SUMMARY

The present invention utilizes a recursive extrapolation whereby the output of the present scan is easily expressed as a simple update of the previous scan. The complete status of every return with respect to it being a signal or not, resides in a single weight attached to that return. This weight may be employed to intensity modulate a display scan, providing direct visual enhancement, or it may be thresholded to provide simply the numerical position of one, or several, signals. The method extends easily to the enhancement of more than one signal. The initiation of a track occurs naturaly as does its loss due to the disappearance of a signal.

It is one object of the present invention, therefore, to provide an improved recursive signal processing apparatus that will permit a pulse to be recognized as being related to or part of a continuous trend of any shape.

It is another object of the invention to provide an improved recursive signal processing apparatus that will recognize a pulse of a continuous trend over any number of scans during which the signal continuity is maintained.

It is yet another object of the invention to provide an improved recursive signal processing apparatus that permits integration arbitrarily far in the past and, through the recursive technique to reduce substantially both the memory requirements and the computational load.

It is still another object of the invention to provide an improved recursive signal processing apparatus whereby signal enhancement is achieved by effectively performing an integration along the signal's entire past length.

BRIEF DESCRIPTION OF THE DRAWINGS

FIG. 4 is a block diagram of the input range gate which is utilized in the recursive signal processing apparatus, and, FIG. 5 is a block diagram of the weight computer which computes the weight for each input.

DESCRIPTION OF THE PREFERRED EMBODIMENT

There are many applications (e.g., radar, sonar, PPM communication) in which noisy data takes the following form. At each time $t_i$, $k\, i = 1,2\ldots$ (typicaly equispaced) there appears a range scan displaying perhaps several pulses (plus a start or synch pulse,) but only one of which pulses represents the signal. In radar, for example, it might be necessary, in order to detect the signal pulse at all, to lower the threshold so far that some noise pulses are admitted also. The interval in which the current input signal exceeds a detection threshold is herein defined as a pulse. In addition, as a consequence of fade, the signal may not even appear in some scans. The problem then is to enhance the signal, and, perhaps in addition, to decide which pulse, if any, of each scan to choose as the signal.

There is a large class of signals that can be characterized as over-sampled, or, with a fixed sampling rate as slowly varying: in particular, a signal pulse slowly changing in position from scan to scan. This characterization implies linearity in the small, but it implies somewhat more over a large number of scans. While the participation of a pulse in a local linear trend offers evidence that that pulse represents a signal, the fact that that pulse is part of a non-linear but continuous trend of greater length can provide much stronger such evidence. The notion of continuity is easily formalized simple by specifying the maximum change in pulse position from the scan at time $t_i$ to the scan at time $t_{i+1}$.

The present apparatus herein described utilizes this slowly varying nature of a signal to provide enhancement with respect to interfering noise pulses. The recursive signal processing apparatus performs a series of simple computations that calls for neither multiplication nor division, and requires only a small arithmetic capability and a modest amount of memory.

The general principle of the present invention is to weight or score a pulse on the basis of the length of that chain of pulses of which the given pulse is the most recent part. The chain herein referred to is simply a more descriptive way of speaking of a continuous path from scan to scan when that path is, in fact, made up of discrete points. Except as noted, that pulse in a scan which belongs to the longest chain will carry the highest score.

Figure 1:
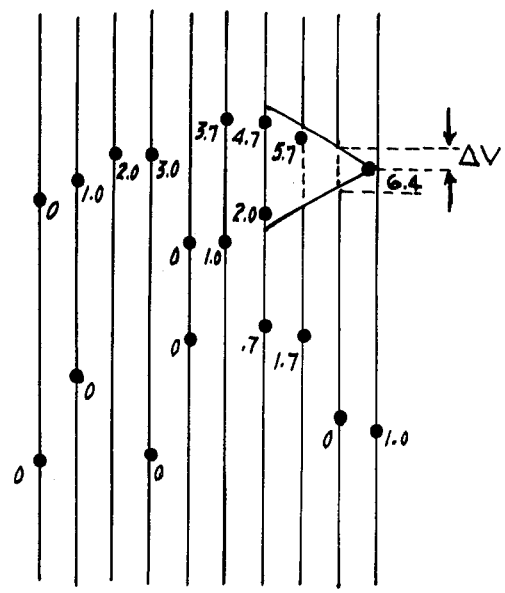
FIG. 1 is a graphical representation of a number of successive scans over a signal.

For the present example, refer to FIG. 1 and let $\Delta V$, a system parameter, be the maximum change to be expected in the position of signal pulses from one scan to the next. This formalizes and defines precisely the notion of continuity; i.e., a sequence of pulses will form a continuous chain if the position changes no more than $\Delta V$ between scans. Let $\alpha$, a system parameter, be a positive number, the size of which is related to the probability of a signal fade in a single scan. Let p denote a pulse in the present scan; a pulse within $j \cdot \Delta V$ ($\Delta V$ summed $j$ times) of the posaition of $p$, but $j$ scans in the past, will be termed a $j$-distant neighbor of $p$.

Let K-1, K a system parameter, be the number of successive scans over which the signal will be taken as continuous despite that number of fades; if fading is not a problem, then take K=1. All pulses are initially weighted to zero. The scans as are shown in FIG. 1 are processed sequentially. Let p be a pulse in the present scan to which a weight is to be assigned. Then there is assigned to p a weight of 1, plus the weight of its most highly weighted 1-neighbor, or 1-$\alpha$ plus the weight of its most highly weighted 2-neighbor, etc., or, finally, 1-(K-1)$\alpha$ plus the weight of its most highly weighted K-neighbor, whichever of these sums is greatest. The example in FIG. 1 shows the progression of weights for various pulses through several scans wherein $\alpha$ is taken as 0.3, $k$=3, and $\Delta V$ as shown.

The following should be noted:

1. If the role of neighbors at distances of 2 or greater is neglected, it is clear that each pulse is assigned a weight equal to the length of the longest chain of which it is a part. The pulse of greatest weight in a scan is that one belonging to the longest chain. The provision for considering $j$-nearest neighbors, $j \leq K$, merely extends the notion of continuity, and permits a chain to carry its weight, with only gradual loss, through several fades.

2. The procedure keeps continual track of the length of chains through all points. A single array of sealer quantities, one per pulse, yields the entire relevant processing history of the pulses in the present scan. It is necessary to retain the positions and weights of pulses in only the K most recent scans.

3. It is clear that several signals could be enhanced simultaneously.

Figure 2:
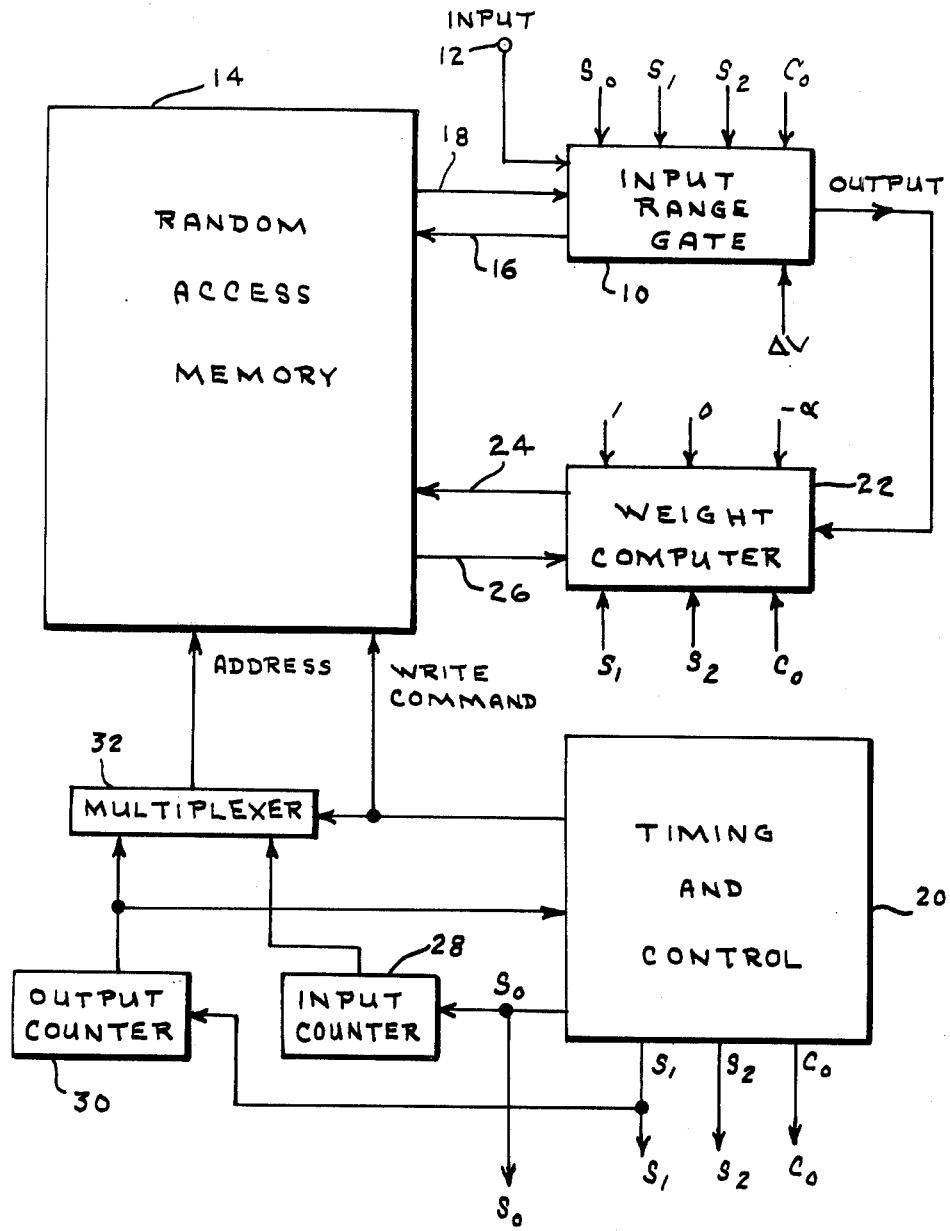
FIG. 2 is a block diagram of the recursive signal processing apparatus in accordance with the present invention.

Turning now to FIG. 2, there is shown a recursive signal processing apparatus which accepts as input information some number of data points for each scan. Each data point is the range associated with a threshold crossing. The processor output is a pair of numbers associated with each threshold crossing: the range and the weight. The parameters of the system are $\Delta V$, $\alpha$, and K.

There is shown in FIG. 2 an input range gate 10 receiving an input signal at terminal 12. The input range gate 10 applies range data to the random access memory 14 by means of line 16 and receives stored range data from the memory 14 by means of line 18. The system parameter $\Delta V$ and the strobe and control signals $S_0$-$S_2$, $C_o$ from the timing and control unit 20 are also received by the input range gate 10. An output signal from the input range gate 10 is applied to the weight computer 22. The weight computer 22 provides weight data to the memory 14 by means of line 24 and receives stored data weight from the memory 14 by means of line 26. The system parameters $-\alpha$, 1, 0, and the control signals, $S_1$, $S_2$, $C_o$ from the timing and control unit 20 are applied to the weight computer 22. The input counter 28 receives the strobe signal $S_o$ from the timing and control unit which applies the strobe signal $S_1$ to the output counter 30. The outputs from the input counter 28 and from the output counter 30 are applied to the multiplexer unit 32 which receives a write command from the timing and control unit 20. The output of the multiplexer 32 is applied to the random access memory 14.

Figure 3:
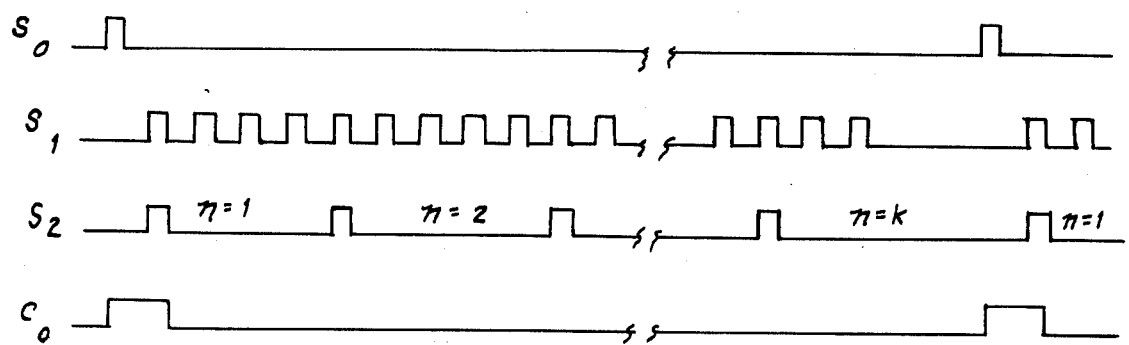
FIG. 3 is a graphical representation of the control signal utilized in the present invention.

There is shown in FIG. 3, a graphic representation of the control signals which are used in the present invention in their respective time sequence. The four control signals may be defined as follows:

$S_0$ — Strobe that reads in each now range input and initializes the computation.

$S_1$ — Strobe that reads from memory each of the previously stored results.

$S_2$ — Strobe that indicates that the data from the memory is from the next earlier scan. ($S_2$ occurs at the same time as the first $S_1$ for this scan.)

$C_0$ — Control gate is true from $S_0$ immediately after the first $S_1$ for this input.

The number of $S_1$ strobes between each $S_2$ strobes is equal to the number of data points which are strobed on the $n^{th}$ previous scan.

In FIG. 4, there is shown in greater detail a block diagram of the input range gate. The input signal (range, R) is applied to the input register 40 along with strobe signal $S_0$. The range data from the input register 40 is simultaneously applied to multiplexers 42, 44 and to the random access memory unit. The outputs respectively from the multiplexers 42, 44 are further processed to obtain limits $R+n\Delta V$ and $R-n\Delta V$ which are finally applied respectively to comparators 46, 48. The comparators 46, 48 compare the received range respectively with the stored range from the random access memory. The comparators 46, 48 respectivey provide an output signal which is representative of the range comparison to the and gate 50. Comparator 46 provides an output signal when the compared range is less than the stored range and comparator 48 provides an output signal when the compared range is greater than the stored range. The input range gate output appears at the output of gate 50. This input range gate is true whenever the input range is within $n\Delta V$ of the stored range.

Turning now to FIG. 5, there is shown a block diagram of the weight computer. The input range gate output is applied to gate 60 and the stored data weight from the memory is applied to adder 62. The function of the weight computer is to compute the weight to be assigned to each input. In the adder 62 $(1-n\alpha)$ times weight of stored return is computed and this value, as the weight for this input is applied to comparator 64. If the input range gate output is true and the new product is larger than any previously retained weights, this value is retained in register 66 and applied to the random access memory. The weight for this input is set to zero initially.

Although the invention has been described with reference to a particular embodiment, it will be understood to those skilled in the art that the invention is capable of a variety of alternative embodiments within the spirit and scope of the appended claims.

What is claimed is:

1. A recursive signal processing apparatus comprising in combination:
   a range determining means receiving an input signal, said input signal being scanned by said range determining means at a predetermined rate, said range determining means displaying a range scan, said range scan including said input signal and a synch pulse, said range scan being repetitive, said input signal containing at least one data pulse therein, said range determining means providing a range signal and a range gate output,
   a computing means receiving said range gate output from said range determining means, said computing means computing a weighting factor for each input signal, said computing means comparing said range gate output with said weighting factor, said computing means providing a weight data output,
   a memory means receiving said range signal from said range determining means, said memory means storing said range signal to provide a stored range signal to said range determining means, said range determining means comparing said input signal with said stored range signal to provide said range gate output, said memory means receiving said weight data output from said computing means, said memory means storing said weight data output to provide a stored data weight to said computing means, said computing means computes $(1 - n\alpha)$ times the stored data weight and retains this weight for the present input signal if the new product is greater than previously stored weights, and,
   a control means to provide strobe and control signals to said range determining means and said computing means, said control means being connected to said memory means to control the acquisition of said range signal and said weight data output, said control means controlling the transmission of said stored range signal to said ranging determining means and said stored data weight to said computing means, said control means controlling the comparison operation within said range determining means and the multiplication and comparison process within said computing means.

2. A recursive signal processing apparatus as described in claim 1 wherein said range determining means recursively processes said input signal with previously stored range signals to provide said range gate output.

3. A recursive signal processing apparatus as described in claim 1 wherein said computing means recursively processes and updates weight data for each input signal and stores the latest weighting factor in said memory means.

4. A recursive signal processing apparatus as described in claim 1 wherein said memory means comprises a random access memory unit.

5. A recursive signal processing apparatus as described in claim 1 wherein said input signal comprises a series of data pulses having a non-linear continuous trend.

* * * * *